(12) United States Patent
Braun

(10) Patent No.: US 9,096,121 B2
(45) Date of Patent: Aug. 4, 2015

(54) COOL AIR PLENUM

(75) Inventor: Kevin G. Braun, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 1696 days.

(21) Appl. No.: 12/356,164

(22) Filed: Jan. 20, 2009

(65) Prior Publication Data
US 2010/0181127 A1 Jul. 22, 2010

(51) Int. Cl.
*B60K 11/00* (2006.01)
*B60K 13/02* (2006.01)

(52) U.S. Cl.
CPC ...................................... *B60K 13/02* (2013.01)

(58) Field of Classification Search
USPC ................ 180/68.3, 68.1, 68.2, 89.12, 69.24; 123/41.7, 184.21, 198 E
See application file for complete search history.

(56) References Cited

U.S. PATENT DOCUMENTS

| | | | | |
|---|---|---|---|---|
| 4,341,277 A | * | 7/1982 | Adamson et al. | 180/68.1 |
| 4,342,289 A | * | 8/1982 | Komp | 123/41.7 |
| 6,068,675 A | * | 5/2000 | Tsuda et al. | 123/198 E |
| 6,263,850 B1 | * | 7/2001 | Winmill et al. | 123/184.21 |
| 6,655,486 B2 | * | 12/2003 | Oshikawa et al. | 180/68.1 |
| 7,204,329 B2 | | 4/2007 | Pfohl et al. | |
| 7,458,434 B2 | * | 12/2008 | Samejima et al. | 180/68.1 |
| 7,836,967 B2 | * | 11/2010 | Daniel et al. | 180/89.12 |
| 7,861,814 B2 | * | 1/2011 | Hageman et al. | 180/68.1 |
| 2004/0216937 A1 | * | 11/2004 | Sena | 180/170 |

OTHER PUBLICATIONS

Declaration of Gregory G. Miller (1 pg).
Tigercat 630C Skidder catalog, also available at www.tigercat.com, 2 pgs.

* cited by examiner

*Primary Examiner* — Hau Phan

(57) ABSTRACT

A cool air plenum for use with an engine air intake system of a utility vehicle. The plenum prevents airflow from an engine to the air intake system.

25 Claims, 4 Drawing Sheets

COOL AIR PLENUM

BACKGROUND

1. Field of the Invention

The present disclosure relates to engine air intake systems. More particularly, the present disclosure relates to a cool air plenum for use with an engine air intake system of a utility vehicle.

2. Description of the Related Art

Utility vehicles, such as tractors, motor graders, bulldozers, and skidders, are powered by turbocharged, internal combustion engines. In operation, utility vehicles take in ambient air, compress the air with a turbocharger, mix the compressed air with fuel, and combust the compressed air and fuel in the internal combustion engine to generate power. If the ambient air is too hot, the compressed air that exits the turbocharger is even hotter, and a higher performing charge air cooler is required to cool the air to the required temperature before combustion. As the demand on the charge air cooler increases, the engine's efficiency decreases and fuel consumption increases.

SUMMARY

The present disclosure provides a cool air plenum for use with an engine air intake system of a utility vehicle.

According to an embodiment of the present disclosure, a utility vehicle is provided including a chassis, at least one ground engaging mechanism configured to propel the chassis over the ground, and at least one work tool configured to move relative to the chassis to move material. The utility vehicle also includes a hood supported by the chassis and defining a hood compartment, and an engine operatively coupled to the at least one ground engaging mechanism to power propulsion of the chassis, the engine being positioned in the hood compartment. The utility vehicle further includes a plenum and an air intake system coupled to the engine and including an air filter, the air intake system being positioned in the plenum, the plenum preventing airflow from the engine to the air filter of the air intake system.

According to another embodiment of the present disclosure, a utility vehicle is provided including a chassis, at least one ground engaging mechanism configured to propel the chassis over the ground, and at least one work tool configured to move relative to the chassis. The utility vehicle also includes a hood supported by the chassis and defining a hood compartment, the hood including a screen, and a baffle that divides the hood compartment into a first hood compartment and a second hood compartment, the baffle being configured to block airflow from the first hood compartment to the second hood compartment, the screen of the hood at least partially defining the second hood compartment. The utility vehicle further includes an engine operatively coupled to the at least one ground engaging mechanism to power propulsion of the chassis, the engine being positioned in the first hood compartment, and an air intake system for the engine including an air inlet port positioned in the second hood compartment, an air filter body coupled to the air inlet port and positioned in the second hood compartment, and an air outlet port coupled to the air filter body and to the engine.

According to yet another embodiment of the present disclosure, a utility vehicle is provided including a chassis, at least one ground engaging mechanism configured to propel the chassis over the ground, and at least one work tool configured to move relative to the chassis to move material. The utility vehicle also includes a hood supported by the chassis and defining a hood compartment, and an engine operatively coupled to the at least one ground engaging mechanism to power propulsion of the chassis, the engine being positioned in the hood compartment. The utility vehicle further includes a plenum, an air intake system coupled to the engine, the air intake system being positioned in the plenum, the plenum preventing airflow from the engine to the air intake system, and a battery positioned in the plenum adjacent to the air intake system, the plenum preventing airflow from the engine to the battery.

BRIEF DESCRIPTION OF THE DRAWINGS

The above-mentioned and other features and advantages of this disclosure, and the manner of attaining them, will become more apparent and the disclosure itself will be better understood by reference to the following description of embodiments of the disclosure taken in conjunction with the accompanying drawings, wherein.

Corresponding reference characters indicate corresponding parts throughout the several views. The exemplifications set out herein illustrate exemplary embodiments of the disclosure and such exemplifications are not to be construed as limiting the scope of the invention in any manner.

DETAILED DESCRIPTION

Figure 1:
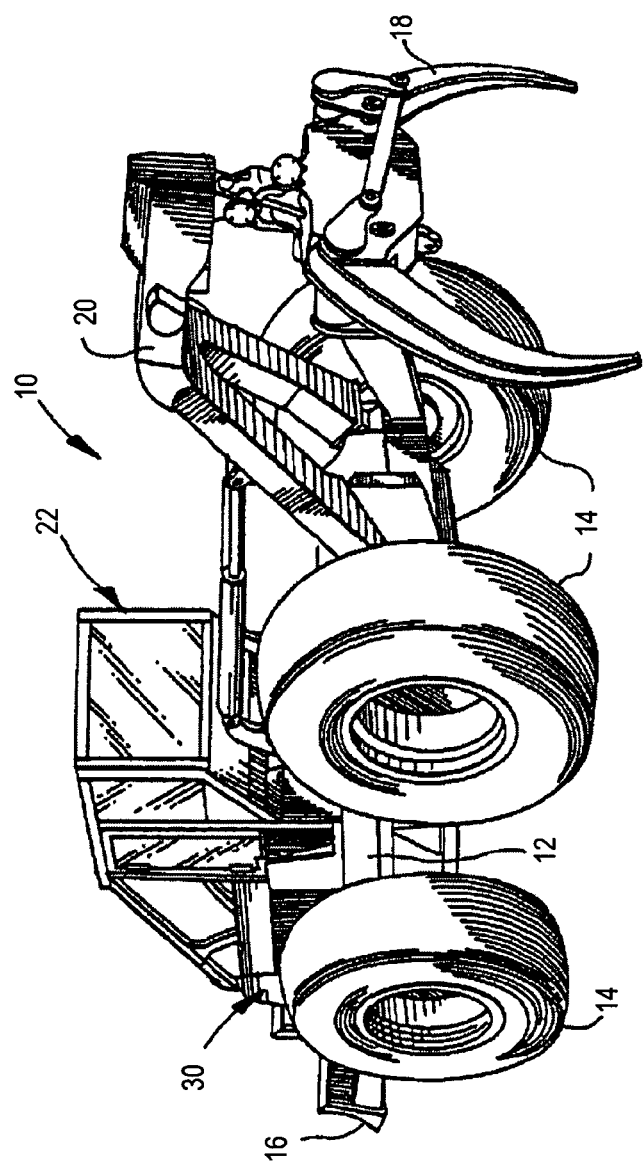
FIG. 1 is a rear perspective view of an embodiment of a utility vehicle.

Referring to FIG. 1, a utility vehicle in the form of skidder 10 is illustrated.

Although the vehicle is illustrated and described herein as skidder 10, the utility vehicle may include a motor grader, a tractor, a bulldozer, or another utility vehicle. Skidder 10 includes chassis 12 and ground engaging mechanism 14. Ground engaging mechanism 14 may be capable of supporting chassis 12 and propelling chassis 12 across the ground. Although the illustrated skidder 10 includes wheels as ground engaging mechanism 14, skidder 10 may include tracks, such as steel tracks or rubber tracks. Skidder 10 also includes one or more work tools, specifically a front-mounted blade 16 and a rear-mounted grapple 18 coupled to chassis 12 via grapple linkage 20. Both blade 16 and grapple 18 are configured to move relative to chassis 12 to move material. For example, blade 16 may be used for leveling dirt and other materials and pushing over trees, and grapple 18 may be used for pulling felled trees. The utility vehicle may be provided with other work tools, such as a bucket, a pallet fork, a bail lift, an auger, a harvester, a tiller, or a mower, for example. Skidder 10 further includes operator cab 22. Operator cab 22 is provided with controls (not shown) to operate skidder 10 and protects the operator.

Figure 2:
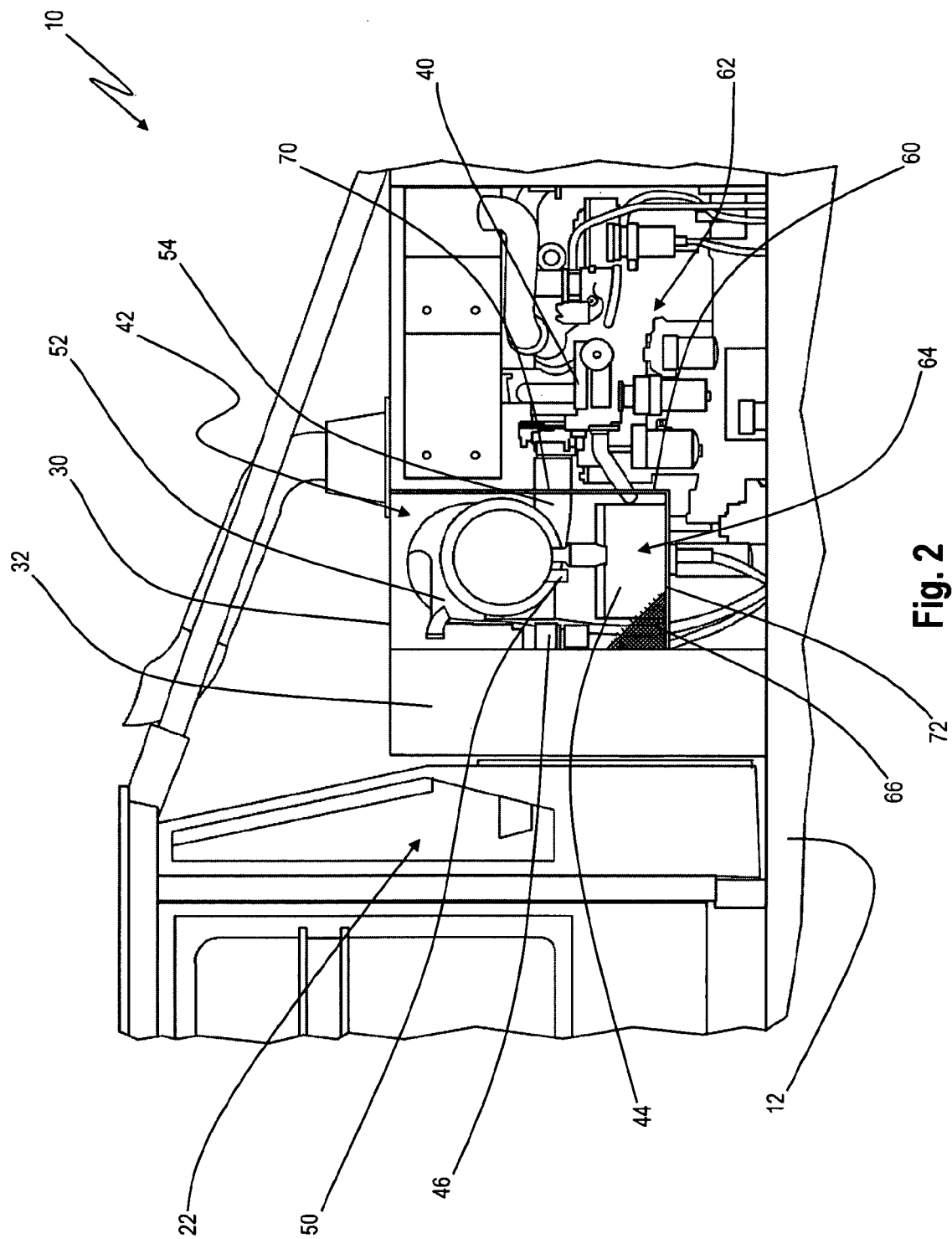
FIG. 2 is an elevational view of a front, right side of the utility vehicle of FIG. 1 with a portion of a hood removed to illustrate an engine and a cool air plenum inside the hood.
Figure 3:
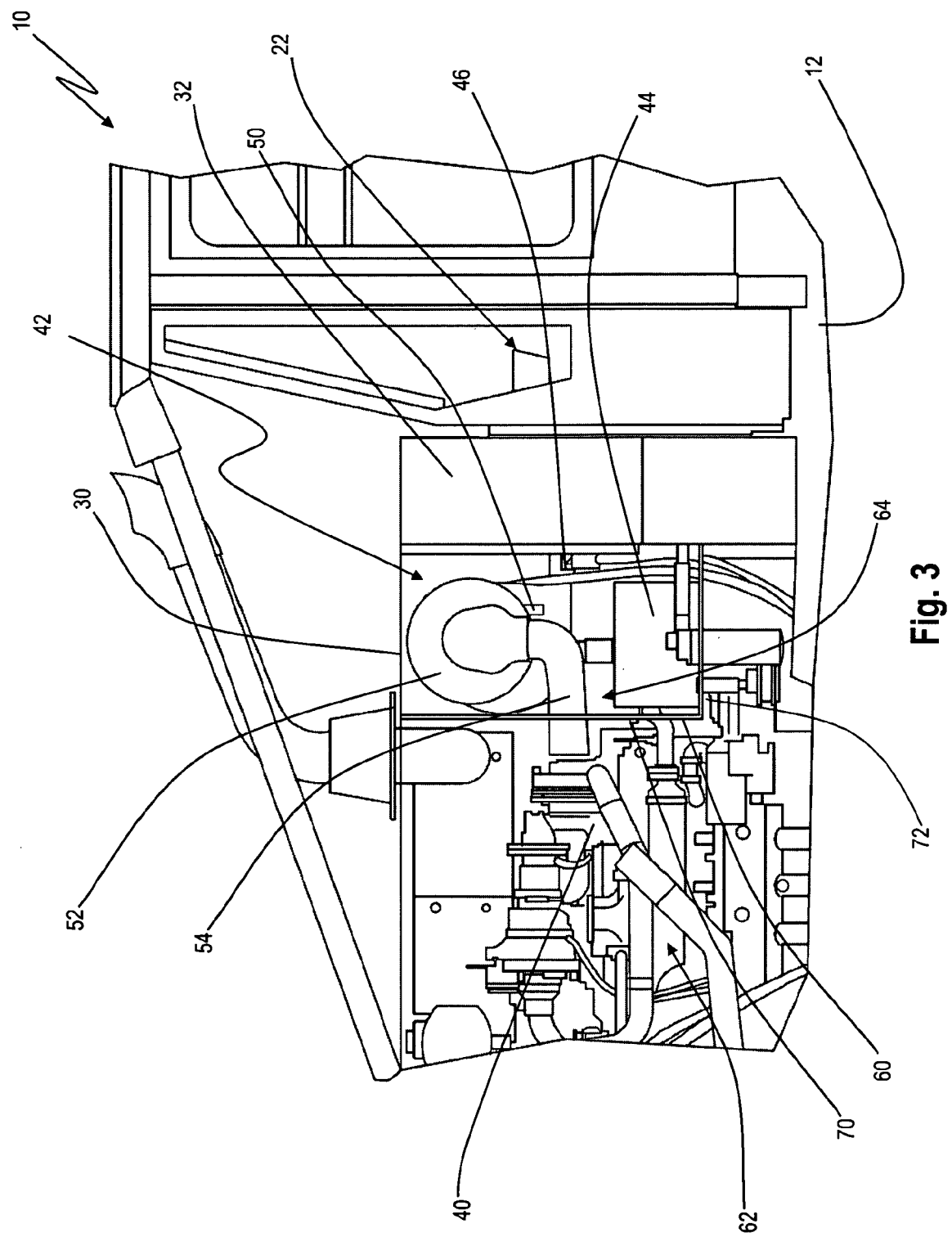
FIG. 3 is an elevational view of a front, left side of the utility vehicle of FIG. 1 with a portion of the hood removed to illustrate the engine and the cool air plenum inside the hood.
Figure 4:
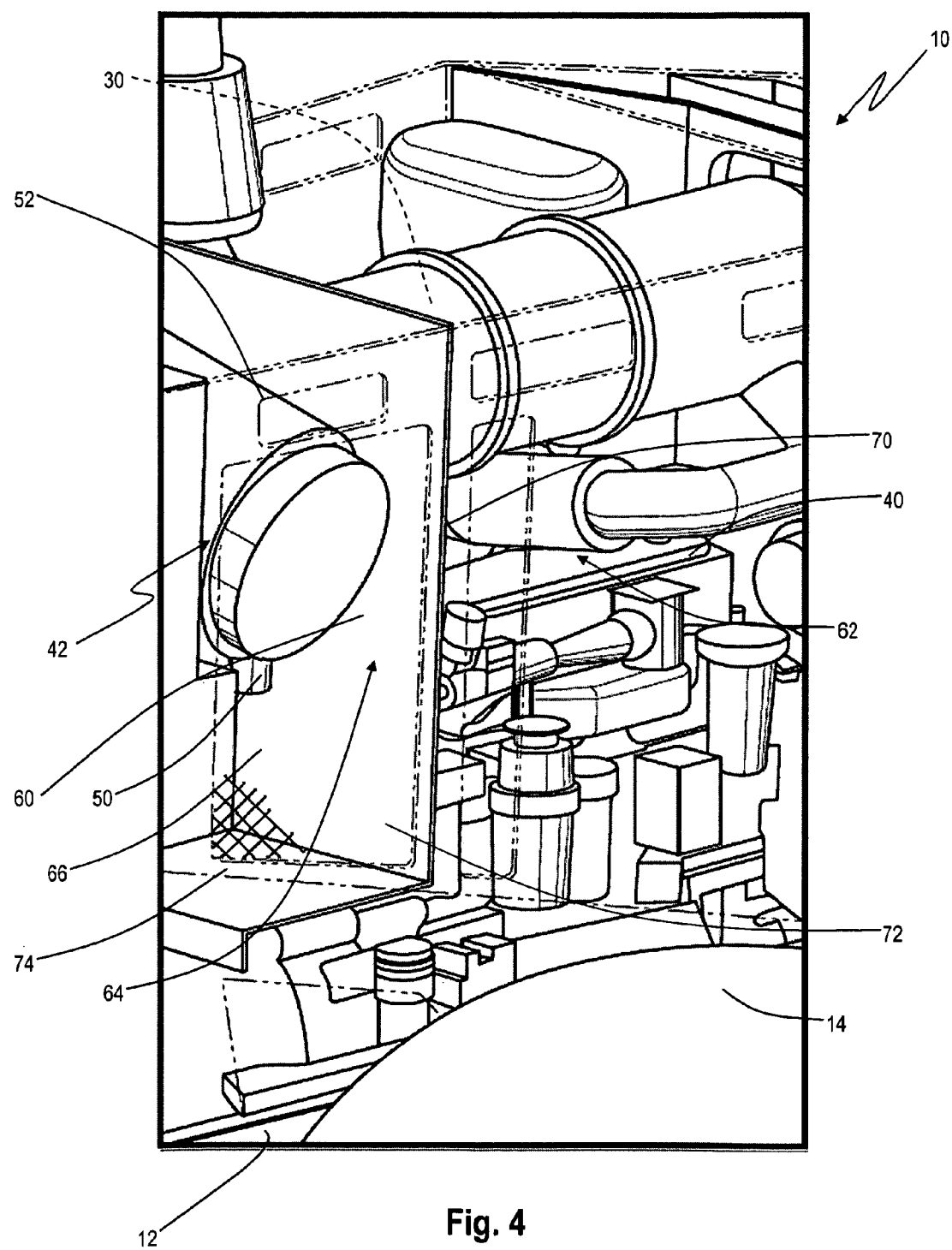
FIG. 4 is a perspective view of a front, right side of the utility vehicle of FIG. 1 illustrating the engine and the cool air plenum inside the hood of the vehicle.

Referring next to FIGS. 2-4, the front end of skidder 10 includes hood 30 to enclose and protect internal combustion engine 40 and other vehicle components, including air intake system 42, battery 44, and engine control unit 46. Hood 30 is supported by chassis 12. Hood 30 may be a one-piece or multi-piece structure and may be constructed of metal, a polymer, or another suitable material. Hood 30 may include a hinged door (not shown) to provide access to internal combustion engine 40 and other vehicle components.

Referring still to FIGS. 2-4, air intake system 42 includes inlet port 50, filter body 52, and outlet port 54. In use, air drawn into inlet port 50 is cleaned inside filter body 52 to remove dust and other debris from the air. The clean air exits filter body 52 via outlet port 54. The clean air may be compressed to an elevated pressure and, if necessary, cooled to a lower temperature before being delivered to internal combustion engine 40. Inside internal combustion engine 40, the air delivered from air intake system 42 is mixed with fuel and combusted. The combustion process generates a significant amount of heat inside hood 30.

As shown in FIGS. 2-4, skidder 10 is provided with baffle 60 that divides the area inside hood 30 into engine compartment 62 and air intake compartment 64. Baffle 60 may be constructed of a suitable material that prevents air in engine compartment 62 from entering air intake compartment 64. For example, baffle 60 may be constructed of solid sheet metal or another suitable material. Baffle 60 may also reduce the heat transferred from engine compartment 62 to air intake compartment 64. In an embodiment, baffle 60 may be insulated with a suitable material to reduce heat transfer through baffle 60. Baffle 60 may include apertures, if necessary, to accommodate components, such as wires or tubes, that extend between engine compartment 62 and air intake compartment 64. However, these apertures should be adequately sized and sealed to prevent air exchange between engine compartment 62 and air intake compartment 64.

Air intake compartment 64 may be defined by a substantially box-shaped structure of skidder 10, including baffle 60. For example, in the illustrated embodiment of FIGS. 2-4, air intake compartment 64 is defined on top by hood 30, and in the rear by wall 32 of skidder 10 that defines a hydraulic reservoir. Air intake compartment 64 may also be defined by portions of chassis 12 or operator cab 22, for example. Air intake compartment 64 is defined on the other two sides by baffle 60. Specifically, air intake compartment 64 is defined in the front by front wall 70 of baffle 60, and on the bottom by bottom wall 72 of baffle 60. It is also within the scope of the present disclosure that baffle 60 may surround one, three, four, five, six, or more, sides of air intake compartment 64. Air intake compartment 64 is defined on its sides by hood 30, which may include any number of side screens 66, as described further below.

Baffle 60 may be sealed against hood 30 or other portions of skidder 10 to define air intake compartment 64. For example, as shown in FIG. 4, the top of top wall 70 of baffle 60 is configured to contact the top of hood 30. Similarly, the sides of top wall 70 of baffle 60 and the sides of bottom wall 72 of baffle 60 are configured to contact the sides of hood 30. Also, baffle 60 may include flange 74 for securing baffle 60 to wall 32 that defines a hydraulic reservoir, hood 30, chassis 12, operator cab 22, or another suitable portion of skidder 10. In addition to providing a location for securing baffle 60 to another portion of skidder 10, flange 74 may seal air intake compartment 64 from engine compartment 62.

According to an exemplary embodiment of the present disclosure, air intake system 42 may be shielded from the hot air generated by and surrounding internal combustion engine 40. Shielding air intake system 42 from hot air surrounding internal combustion engine 40 reduces the temperature of the combustion air delivered to internal combustion engine 40, thereby reducing the energy required to cool the combustion air before combustion and improving the overall efficiency of internal combustion engine 40. At least a portion of air intake system 42 may be positioned in air intake compartment 64 of hood 30 and internal combustion engine 40 may be positioned in engine compartment 62. In this arrangement, the air inside air intake compartment 64 may be cooler than the hot air inside engine compartment 62. Thus, air intake compartment 64 may serve as a cool air chamber or plenum.

According to another exemplary embodiment of the present disclosure, at least a portion of the structure defining air intake compartment 64 may be vented or screened to permit ambient airflow into and out of air intake compartment 64 of hood 30. For example, hood 30 may include at least one side screen 66, a portion of which is illustrated in FIG. 2 and FIG. 4. In the illustrated embodiment, side screen 66 of hood 30 defines an exterior side of air intake compartment 64. Side screen 66, located on one or both sides of skidder 10, may eliminate the need for an exposed, above-hood air intake system that may be susceptible to damage from debris, such as falling tree limbs.

In operation, air intake system 42 draws cool, ambient air through side screen 66 into inlet port 50. Then, the air travels through filter body 52 of air intake system 42. With filter body 52 positioned inside air intake compartment 64 behind baffle 60, as shown in FIG. 2, the air is not substantially heated by internal combustion engine 40 during filtration. After filtration, the air travels through outlet port 54 toward internal combustion engine 40. Outlet port 54 may include a flexible tube that extends from filter body 52, through an aperture in baffle 60, toward internal combustion engine 40. Thus, outlet port 54 is shielded from the hot air in engine compartment 62 until crossing beyond baffle 60. The distance that outlet port 54 travels through engine compartment 62 until reaching internal combustion engine 40 may be minimized to avoid substantially heating the combustion air.

According to an exemplary embodiment of the present disclosure, temperature-sensitive vehicle components, such as battery 44 and engine control unit 46, may also be positioned in air intake compartment 64 of hood 30. In this arrangement, baffle 60 may shield air intake system 42, battery 44, and engine control unit 46 from the hot air in engine compartment 62.

The components described above may be designed to minimize the temperature of the combustion air entering internal combustion engine 40. For example, the size, shape, materials, and position of baffle 60 may be varied to prevent heat transfer from engine compartment 62 into air intake compartment 64.

While this invention has been described as having preferred designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:
1. A utility vehicle including:
a chassis;
at least one ground engaging mechanism configured to propel the chassis over the ground;
at least one work tool configured to move relative to the chassis to move material;
a hood supported by the chassis and defining a hood compartment;

an engine operatively coupled to the at least one ground engaging mechanism to power propulsion of the chassis, the engine being positioned in the hood compartment;

a plenum; and an air intake system coupled to the engine and including an air filter, the air intake system being positioned in the plenum, the plenum preventing airflow from the engine to the air filter of the air intake system.

2. The utility vehicle of claim 1, wherein the work tool includes at least one of a blade, a grapple, a bucket, a pallet fork, a bail lift, an auger, a harvester, a tiller, and a mower.

3. The utility vehicle of claim 1, further including a battery positioned in the plenum, the plenum preventing airflow from the engine to the battery.

4. The utility vehicle of claim 1, further including an engine control unit positioned in the plenum, the plenum preventing airflow from the engine to the engine control unit.

5. The utility vehicle of claim 1, wherein the plenum is at least partially defined by a baffle positioned in the hood compartment, and the air intake system includes an outlet port that extends through the baffle from the air filter to the engine.

6. The utility vehicle of claim 1, wherein the hood includes a screen that at least partially surrounds the air intake system.

7. The utility vehicle of claim 1, wherein the chassis supports an operator cab and includes a longitudinal axis, the plenum located longitudinally between the operator cab and the engine.

8. The utility vehicle of claim 1, wherein the plenum is at least partially defined by a generally horizontal baffle, the generally horizontal baffle located between a top side of the hood compartment and a bottom side of the hood compartment.

9. A utility vehicle including:
a chassis;
at least one ground engaging mechanism configured to propel the chassis over the ground;
at least one work tool configured to move relative to the chassis;
a hood supported by the chassis and defining a hood compartment, the hood including a screen;
a baffle that divides the hood compartment into a first hood compartment and a second hood compartment, the baffle being configured to block airflow from the first hood compartment to the second hood compartment, the screen of the hood at least partially defining the second hood compartment;
an engine operatively coupled to the at least one ground engaging mechanism to power propulsion of the chassis, the engine being positioned in the first hood compartment, the baffle separating the engine from the second hood compartment; and
an air intake system for the engine including:
an air inlet port positioned in the second hood compartment;
an air filter body coupled to the air inlet port and positioned in the second hood compartment; and
an air outlet port coupled to the air filter body and to the engine.

10. The utility vehicle of claim 9, wherein the screen extends along at least one side of the hood.

11. The utility vehicle of claim 9, further including a battery positioned in the second hood compartment.

12. The utility vehicle of claim 9, further including an engine control unit positioned in the second hood compartment.

13. The utility vehicle of claim 9, wherein the air outlet port extends through the baffle and between the first and second hood compartments.

14. The utility vehicle of claim 9, wherein the baffle cooperates with the hood to define the second hood compartment.

15. The utility vehicle of claim 9, wherein the work tool includes at least one of a blade, a grapple, a bucket, a pallet fork, a bail lift, an auger, a harvester, a tiller, and a mower.

16. The utility vehicle of claim 9, wherein the baffle defines an air passageway between the first and second hood compartments such that substantially all of the air that travels between the first and second hood compartments travels through the air passageway.

17. The utility vehicle of claim 16, wherein the air outlet port of the air intake system extends through the air passageway in the baffle to direct the air from the air filter body to the engine.

18. The utility vehicle of claim 9, wherein a height of the first hood compartment exceeds a height of the second hood compartment.

19. A utility vehicle including:
a chassis;
at least one ground engaging mechanism configured to propel the chassis over the ground;
at least one work tool configured to move relative to the chassis to move material;
a hood supported by the chassis and defining a hood compartment;
an engine operatively coupled to the at least one ground engaging mechanism to power propulsion of the chassis, the engine being positioned in the hood compartment;
a plenum;
an air intake system coupled to the engine, the air intake system being positioned in the plenum, the plenum preventing airflow from the engine to the air intake system; and
a battery positioned in the plenum adjacent to the air intake system, the plenum preventing airflow from the engine to the battery.

20. The utility vehicle of claim 19, wherein the work tool includes at least one of a blade, a grapple, a bucket, a pallet fork, a bail lift, an auger, a harvester, a tiller, and a mower.

21. The utility vehicle of claim 19, further including an engine control unit positioned in the plenum adjacent to the air intake system, the plenum preventing airflow from the engine to the engine control unit.

22. The utility vehicle of claim 19, wherein the plenum is at least partially defined by a baffle positioned in the hood compartment, and the air intake system includes an air filter and an outlet port that extends through the baffle from the air filter to the engine.

23. The utility vehicle of claim 19, wherein the hood includes a screen that at least partially surrounds the air intake system.

24. The utility vehicle of claim 23, wherein the air intake system includes an inlet port positioned adjacent to the screen to draw ambient air through the screen and into the engine.

25. The utility vehicle of claim 19, wherein the plenum is at least partially defined by the hood.

* * * * *